United States Patent
Klos et al.

(10) Patent No.: US 8,438,925 B2
(45) Date of Patent: May 14, 2013

(54) METHOD AND ARRANGEMENT FOR DETERMINING AND MONITORING THE STATE OF A ROLLING BEARING

(75) Inventors: Hans-Henning Klos, Nürnberg (DE); Klaus-Dieter Müller, Nürnberg (DE); Stefan Scherer, Nuremberg (DE); Klaus Helmut Theodor Scherer, legal representative, Nuremberg (DE); Martha Gertraud Scherer, legal representative, Nuremberg (DE); Mike Zinecker, Altenburg (DE)

(73) Assignee: Siemens Aktiengesellschaft, Munich (DE)

( * ) Notice: Subject to any disclaimer, the term of this patent is extended or adjusted under 35 U.S.C. 154(b) by 234 days.

(21) Appl. No.: 13/055,677

(22) PCT Filed: Jul. 24, 2008

(86) PCT No.: PCT/EP2008/006388
§ 371 (c)(1),
(2), (4) Date: Mar. 22, 2011

(87) PCT Pub. No.: WO2010/009750
PCT Pub. Date: Jan. 28, 2010

(65) Prior Publication Data
US 2011/0219880 A1      Sep. 15, 2011

(51) Int. Cl.
*G01N 29/14*      (2006.01)

(52) U.S. Cl.
USPC ............ 73/587; 73/593; 73/660

(58) Field of Classification Search ........ 73/587, 73/593, 660
See application file for complete search history.

(56) References Cited

U.S. PATENT DOCUMENTS

| | | | |
|---|---|---|---|
| 4,165,458 A | | 8/1979 | Koizumi et al. |
| 4,366,544 A | | 12/1982 | Shima et al. |
| 4,406,169 A | * | 9/1983 | Ikeuchi et al. ........... 73/862.541 |
| 4,927,299 A | * | 5/1990 | Ramalingam et al. ........ 407/120 |
| 5,072,611 A | * | 12/1991 | Budd et al. ................. 73/115.07 |
| 6,321,602 B1 | | 11/2001 | Ben-Romdhane |
| 6,553,837 B1 | * | 4/2003 | Lysen ............................ 73/579 |
| 6,711,952 B2 | * | 3/2004 | Leamy et al. .................... 73/579 |
| 7,184,930 B2 | * | 2/2007 | Miyasaka et al. ............. 702/183 |
| 7,555,953 B2 | * | 7/2009 | Yoshioka et al. ............... 73/587 |
| 2007/0118333 A1 | | 5/2007 | Miyasaka et al. | |

FOREIGN PATENT DOCUMENTS

| | | |
|---|---|---|
| JP | 2001-21453 | 1/2001 |
| WO | WO 2004/109250 | 12/2004 |

* cited by examiner

*Primary Examiner* — J M Saint Surin
(74) *Attorney, Agent, or Firm* — Cozen O'Connor

(57) ABSTRACT

An arrangement and method for determining and monitoring the state of a rolling bearing, wherein a first sensor signal is captured in the form of a sound emission signal in a first frequency band in the ultrasonic range during operation of the rolling bearing, a second sensor signal is captured in a second frequency band of lower frequency in the ultrasonic range, a first characteristic value for recently occurred damage is determined from the shape of the first sensor signal, a second characteristic value for recently occurred damage is determined from the shape of the second sensor signal, and the state of the rolling bearing is determined by comparing the first characteristic value to a reference value dependent on the speed of the rolling bearing and dependent on the second characteristic value to at least one second reference value dependent on the speed of the rolling bearing.

25 Claims, 3 Drawing Sheets

METHOD AND ARRANGEMENT FOR DETERMINING AND MONITORING THE STATE OF A ROLLING BEARING

CROSS-REFERENCE TO RELATED APPLICATIONS

This is a U.S. national stage of International Application No. PCT/EP2008/006388, filed on 24 Jul. 2008.

BACKGROUND OF THE INVENTION

1. Field of the Invention

The present invention relates to diagnostics and, more particularly, to a method and arrangement for determining and monitoring the state of a rolling bearing.

2. Description of the Related Art

Monitoring the state and wear of rolling bearings is of great importance in practice, as experience has shown that approximately 70% of the malfunctions occurring in production and process equipment are caused, by damage in rolling bearings.

SUMMARY OF THE INVENTION

It is therefore an object of the present invention to provide a particularly simple and effective method for determining and monitoring the state of a rolling bearing and to provide an arrangement supporting a particularly simple and effective method of this kind.

These and other objects and advantages are achieved in accordance with the invention by a method for determining and monitoring the state of a rolling bearing, where during operation of the rolling bearing a first sensor signal comprising an acoustic emission signal is captured in a first frequency band in the ultrasonic range, a second sensor signal is captured in a second frequency band of lower frequency in the ultrasonic range, at least one first characteristic value for ongoing damage to the rolling bearing is determined from the signal shape of the first sensor signal, at least one second characteristic value for damage already caused to the rolling bearing is determined from the signal shape of the second sensor signal and the state of the rolling bearing is determined by comparing the at least one first characteristic value with at least one first reference value dependent on the speed of the rolling bearing and by comparing the at least one second characteristic value with at least one second reference value dependent on the speed of the rolling bearing.

In accordance with the method of the invention, a first sensor signal comprising an acoustic emission signal is captured in a first frequency band in the ultrasonic range. In this context, the term "acoustic emission (AE)" is to be understood as meaning a phenomenon in which elastic waves are generated by abrupt excitation due to a sudden release of energy within a material. Corresponding acoustic emission signals, which propagate in the form of structure-borne sound in the material, usually occur in a frequency range extending from around 100 kHz to 1 MHz, where the acoustic emission signals have a high sensitivity in respect of mechanical damage of a material or of an object. Consequently, in the event of destruction of a steel rolling bearing, for example, an acoustic emission signal is generated which, according to the first feature of the method in accordance with the invention, is captured in a first frequency band in the ultrasonic range. In addition, a second sensor signal is captured in accordance with the invention in a second frequency band of lower frequency, i.e., in a frequency range <100 kHz, in the ultrasonic range. In particular, the second sensor signal records "damage" frequencies which, in the case of existing damage that has already occurred, are caused by resonance excitations when a rolling bearing is rotating.

At least one first characteristic value for ongoing damage to the rolling bearing is now determined from the signal shape of the first sensor signal. As mentioned above, the destruction of steel, for example, i.e., in the present case the steel of the rolling bearing, results in an acoustic emission signal at a typical frequency, which therefore indicates ongoing, i.e., actively progressive damage to the rolling bearing. In addition, at least one second characteristic value for damage already caused to the rolling bearing is determined from the signal shape of the second sensor signal, both the at least one first characteristic value and the at least one second characteristic value preferably being determined from the envelope curve of the respective sensor signal, as this reduces the amount of data to be processed, thereby simplifying the method.

The state of the rolling bearing is now determined by comparing the at least one first characteristic value with at least one first reference value dependent on the speed of the rolling bearing and comparing the at least one second characteristic value with at least one reference value dependent on the speed of the rolling bearing. This advantageously enables both the actual state and the future progression of the state of the rolling bearing to be gauged. Both the first and the second reference value are dependent on the respective speed of the rolling bearing, as it has been shown that the amplitudes of the first and of the second sensor signal are each proportional to the speed of the rolling bearing.

The reference values used for comparison with the respective characteristic values can preferably be values obtained by reference measurements on rolling bearings damaged or becoming damaged in a known manner. In this case, the attaining or exceeding of the respective reference value by a respective characteristic value directly indicates corresponding damage to the rolling bearing, thereby enabling the state of the rolling bearing to be accurately assessed. Alternatively, however, values measured in an undamaged state of the rolling bearing can also be used as reference values. In this case, the rolling bearing is then, for example, regarded as being at risk of failure, i.e., its state is deemed to be critical, if at least one of the characteristic values exceeds the respective associated reference value by a predefined or predefinable amount.

In general, the method in accordance with the invention provides the advantage that a rolling bearing can be monitored in a particularly simple way. Thus, the method can be implemented for example using a single sensor, it being advantageously possible to use the same sensor irrespective of the type and size of the rolling bearing. In addition, the combined capture and evaluation of the first and second sensor signal enables the state of the rolling bearing to be determined in a particularly effective, i.e., diagnostically useful manner. Consequently, the monitoring of the state of the rolling bearing can be used as a reliable way to decide whether the rolling bearing requires repair or replacement or when such a repair or replacement is likely to become necessary.

In a particularly preferred embodiment of the method in accordance with the invention, the at least one first characteristic value is compared with at least one first reference value that is also dependent on the material, size, mass and/or type of the rolling bearing. This is advantageous, as the first reference value will generally exhibit a dependency on the material and the size or mass of the rolling bearing and therefore also on the type of the rolling bearing. Thus, because of the nature of its origin, i.e., because of the use of a first sensor signal in the form of an acoustic emission signal, the at least one first reference value is generally dependent at least to some extent on the material of the rolling bearing in question. Although the material of the rolling bearing will normally be steel, the method in accordance with the invention is basically applicable to rolling bearings of any material. To enable the state of the rolling bearing to be monitored as accurately as possible, at least one of the above variables is therefore advantageously taken into account for determining or defining the at least one first reference value prior to performing the method. In addition to determining the first reference value for the particular rolling bearing type used, which can also be achieved by measuring the first reference value for various rolling bearings of different size, different mass and/or different type and calculating or simulating the at least one first reference value for rolling bearings of another type on the basis of such a measurement.

The method in accordance with the invention can preferably also be organized such that the at least one second characteristic value is compared with at least one second reference value also dependent on the material, size, mass and/or type of the rolling bearing. As stated above in connection with the first reference value, which also applies correspondingly to the second reference value, this offers the advantage of enabling the state of the rolling bearing to be determined or monitored particularly accurately and reliably. However, compared to the at least one first characteristic value or the at least one first reference value, the second characteristic value and therefore also the second reference value will generally be comparatively less strongly dependent or possibly not even dependent at all on the material of the rolling bearing.

In another preferred embodiment of the method, the first sensor signal is captured by a first mechanically oscillatory system with a first resonant frequency dependent on the material of the rolling bearing and independent of the size and speed of the rolling bearing. As a result of comprehensive testing on both damaged and undamaged rolling bearings, it has been found that the acoustic emission signal captured by the first sensor signal is essentially not dependent on the size and speed of the rolling bearing in respect of its frequency. This makes it advantageously possible to capture the first sensor signal, for example, for all rolling bearings made of steel by a first mechanically oscillatory system with the same first resonant frequency. The basic advantage of this is that a sensor device configured to capture the first sensor signal can be used for any rolling bearings of the same material.

In a particularly advantageous further embodiment of the method, in the case of a steel rolling bearing, the first sensor signal is captured at a resonant frequency of between 100 kHz and 120 kHz. Thus, in the course of the extensive testing and studies already mentioned it has been found that in particular a frequency of the first sensor signal of approximately 110 kHz is characteristic of the destruction of a steel rolling bearing irrespective of the speed or type of the rolling bearing.

The contemplated embodiments of the method in accordance with the invention can preferably also be executed such that the first sensor signal is captured in a first frequency band with a bandwidth of 4 kHz to 8 kHz. It has been found that capturing the first sensor signal in a narrow first frequency band of the width enables measured values to be captured in a particularly accurate and diagnostically useful manner. Compared to wideband capturing of the first sensor signal, this offers in particular the fundamental advantage that it avoids the cost/complexity of subsequent processing, such as filtering, of the first sensor signal.

The contemplated embodiments of the method in accordance with the invention can advantageously also be implemented such that the second sensor signal is captured independently of the material, size and speed of the rolling bearing by a second mechanically oscillatory system with a second resonant frequency in the frequency range between 25 kHz and 50 kHz. For example, it was able to be demonstrated that capture of the second sensor signal at a second resonant frequency in the frequency range between 25 kHz and 50 kHz, independently of the material, speed and size of the rolling bearing, is particularly diagnostically useful in respect of rolling bearing damage that has already occurred.

The contemplated embodiments of the method in accordance with the invention are preferably implemented such that the second sensor signal is captured in a second frequency band with a bandwidth of 3 kHz to 7 kHz. Also in respect of the second sensor signal, it has been found particularly advantageous if the second sensor signal is captured on a narrowband basis, i.e., with a bandwidth of between 3 kHz and 7 kHz. This provides a simple way to eliminate interference signals, thereby considerably reducing signal processing complexity.

The first characteristic value and the second characteristic value can basically be any characteristic quantities which characterize the signal shape of the respective sensor signal. According to a preferred embodiment of the inventive method, a particularly diagnostically useful and simple determination of the characteristic values is possible by determining in each case the product of the maximum and RMS value of the respective sensor signal to determine the first characteristic value and the second characteristic value. The characteristic value can be given by the respective product itself or determined, for example, by multiplying the product by a constant factor.

The contemplated embodiments of the method are advantageously implemented such that an alarm signal is output if the at least one first characteristic value and/or the at least one second characteristic value deviate from the respective reference value over a defined period of time. This is advantageous, as it enables for example operating or monitoring personnel to be informed about existing damage or impending damage or impending failure of the rolling bearing, it being advantageously possible to specify, on an application-specific basis, how large a deviation of the at least one first characteristic value and/or of the at least one second characteristic value from the respective reference value can become before an alarm is raised by outputting an alarm signal.

The object of the invention is also achieved by an arrangement for determining and monitoring the state of a rolling bearing during its operation, comprising a first sensor device for capturing a first sensor signal comprising an acoustic emission signal in a first frequency band in the ultrasonic range, a second sensor device for capturing a second sensor signal in a second frequency band of lower frequency in the ultrasonic range, a first signal processing device for determining at least one first characteristic value for ongoing damage to the rolling bearing from the signal shape of the first sensor signal, a second signal processing device for determining at least one second characteristic value for rolling bearing damage that has already occurred from the signal shape of the second sensor signal, and an evaluation device for determining the state of the rolling bearing by comparing the at least one first characteristic value with at least one first reference value dependent on the speed of the rolling bearing and comparing the at least one second characteristic value with at least one second reference value dependent on the speed of the rolling bearing.

The advantages of the arrangement according to the invention are essentially similar to those of the disclosed embodiments of the method in accordance with the invention, so that in this connection reference is made to the relevant foregoing description. The same applies to preferred further embodiments of the arrangement in accordance with the invention set out below, with reference in each case to the corresponding preferred further embodiments of the method the invention.

The arrangement in accordance with the invention is advantageously implemented such that the evaluation device is configured to compare the at least one first characteristic value with at least one first reference value also dependent on the material, size, mass and/or type of the rolling bearing.

In another particularly preferred further embodiment, the arrangement in accordance with the invention is further configured such that the evaluation device compares the at least one second characteristic value with at least one second reference value also dependent on the material, size, mass and/or type of the rolling bearing.

The arrangement in accordance with the contemplated embodiments of the invention can also be advantageously configured such that the first sensor device has a first mechanically oscillatory system with a first resonant frequency for capturing the first sensor signal dependent on the material of rolling bearing and independently of the size and speed of the rolling bearing.

In another particularly preferred embodiment, the arrangement is further configured such that the first sensor device for determining the state of a steel rolling bearing captures the first sensor signal at a resonant frequency of between 100 kHz and 120 kHz.

In another embodiment, the arrangement is advantageously configured such that the first sensor device captures the first sensor signal in a first frequency band with a bandwidth of 4 kHz to 8 kHz.

In another particularly preferred embodiment, the arrangement is further configured such that the second sensor device for capturing the second sensor signal independently of the material, size and speed of the rolling bearing has a second mechanically oscillatory system with a second resonant frequency in the frequency range between 25 kHz and 50 kHz.

In a particularly preferred embodiment of the arrangement, the second sensor device is configured to capture the second sensor signal in a second frequency band with a bandwidth of 3 kHz to 7 kHz.

In a preferred embodiment, the arrangement configured such that the first and second signal processing devices for determining the first and second characteristic value respectively determine the product of the maximum and RMS values of the respective sensor signal.

In another embodiment, the arrangement is advantageously further configured such that the evaluation device is outputs an alarm signal if the at least one first characteristic value and/or the at least one second characteristic value deviates from the respective reference value over a defined time period.

In an additional embodiment, the arrangement is advantageously configured such that the first and the second sensor device are implemented as a common micromechanical system.

Corresponding micromechanical systems, which are also known as micro-electro-mechanical systems (MEMS) have the advantage of being small, efficient and comparatively inexpensive.

In a preferred embodiment, the arrangement is preferably also be implemented such that the first and/or the second sensor device are piezoelectric, piezoresistive, capacitive or inductive sensor units. This is particularly advantageous in the case of the first and second sensor device being implemented as a common micromechanical system, i.e., if the sensor devices are mounted on a common substrate, for example.

In another embodiment, the arrangement is advantageously configured such that the first signal processing device, the second signal processing device and the evaluation device are combined in an integrated electrical circuit, thereby in turn enabling the arrangement of the contemplated embodiment to be implemented in a particularly simple, space-saving and inexpensive manner.

In a further embodiment, the arrangement is preferably be configured such that the first and second sensor device are incorporated in an integrated electrical circuit.

In another particularly preferred embodiment of the arrangement, an amplifier unit for amplifying the first and/or the second sensor signal is provided, and the evaluation device is configured to adjust the gain of the amplifier unit. This is advantageous, because generally large signal ranges, i.e., large amplitude differences, must be covered by the sensor devices, particularly because of the speed dependency of the signal amplitude. The resultant exacting requirements placed on the dynamics are therefore advantageously met in that the amplifier unit is adjusted by the evaluation device to a suitable gain level as a function of the input signal strength.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be explained in greater detail with reference to exemplary embodiments and the accompanying drawings, in which.

DETAILED DESCRIPTION OF PREFERRED EMBODIMENTS

Figure 1:
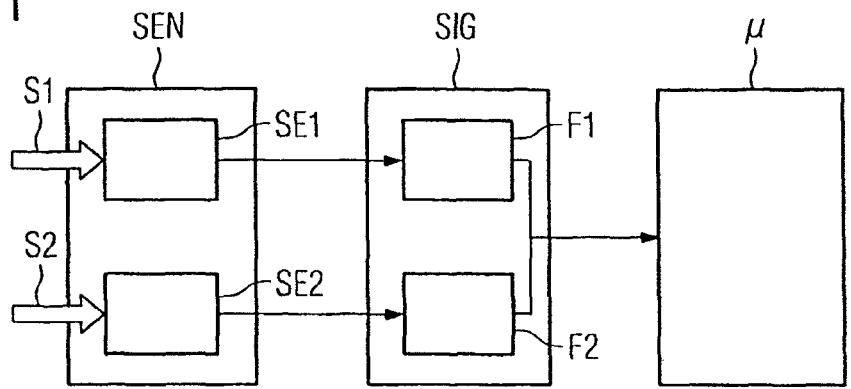
FIG. 1 schematically illustrates a first exemplary embodiment of the arrangement in accordance with the invention.

For reasons of clarity, identical components or components having essentially identical functionality are identified by the same reference characters in each case.

FIG. 1 schematically illustrates a first exemplary embodiment of the arrangement in accordance with the invention, where it is assumed that the arrangement is used to monitor a steel rolling bearing. For this purpose, the arrangement has a first sensor device SE1 for capturing a first sensor signal S1 in the form of an acoustic emission signal in a first frequency band in the ultrasonic range. In the exemplary embodiment described, the first sensor signal S1 is captured by a first mechanically oscillatory system (not shown in FIG. 1) at a first resonant frequency of 110 kHz with a bandwidth of 4 kHz to 8 kHz, i.e., 5 kHz, for example. It has been found that particularly for measuring in the range of the above-mentioned first resonant frequency, a first characteristic value can be determined from the signal shape of the first sensor signal, where the value provides a particularly reliable indication of ongoing, i.e., actively progressive rolling bearing damage. Thus, the frequency of approximately 110 kHz is indicative of the destruction of a steel rolling bearing and is, in particular, not dependent on the speed or type of the rolling bearing.

The arrangement additionally has a second sensor device SE2 for capturing a second sensor signal S2 in a second frequency band of lower frequency in the ultrasonic range, where the capture is performed by a second mechanically oscillatory system with a second resonant frequency of 40 kHz and a bandwidth of likewise 5 kHz. Extensive testing has shown this frequency range to be particularly suitable for determining damage that has already occurred, i.e., existing damage, to the rolling bearing from the signal shape of the second sensor signal S2, where the frequency range is advantageously independent of the speed and type of the respective rolling bearing.

The two sensor devices SE1 and SE2 which, in the exemplary embodiment in FIG. 1, are combined in a common sensor SEN, e.g., in the form of a micromechanical system integrated on an electrical circuit, therefore enable the same sensor SEN to be used for all steel rolling bearings. The reason for this is that the two resonant frequencies are neither dependent on the speed nor on the size of the rolling bearing. If the rolling bearing is of a material other than steel, it would advantageously only be necessary to adapt the first resonant frequency.

In the exemplary embodiment in FIG. 1 it shall be assumed that, using a first signal processing device F1, a first characteristic value for ongoing damage to the rolling bearing is determined from the signal shape of the first sensor signal S1. Correspondingly, by using the second signal processing device F2, a second characteristic value for rolling bearing damage that has already occurred is determined from the signal shape of the second sensor signal S2. As shown in FIG. 1, the first and second signal processing devices F1, F2, which can be implemented, e.g., as filters, are advantageously combined in an integrated electrical circuit which can if necessary additionally incorporate an evaluation device µ, e.g., a microprocessor. The evaluation device µ is used to determine the state of the rolling bearing by comparing the first characteristic value with a first reference value dependent on the speed of the rolling bearing and comparing the second characteristic value with a second reference value dependent on the speed of the rolling bearing.

In the exemplary embodiment in FIG. 1, the first signal processing device F1 and the second signal processing device F2, which are integrated in a common signal processing device SIG, determine the respective characteristic value based on the envelope curve of each respective sensor signal. The advantage of this is that less data has to be processed compared to an evaluation that is based on the actual respective sensor signal.

It shall now be assumed that the respective characteristic value is determined by the first signal processing device F1 and the second signal processing device F2 as the product of the maximum value of the amplitude of the respective sensor signal S1, S2 and the respective RMS value, i.e., the quadratic mean, of the amplitude of the same sensor signal S1, S2, i.e. $K1=Max1(t)*RMS1(t)$ and $K2=Max2(t)*RMS2(t)$, where $Max1(t)$ and $Max2(t)$ denote the respective maximum values, and $RMS1(t)$ and $RMS2(t)$ denote the respective RMS values of the first sensor signal S1 and second sensor signal S2, respectively. The time dependence of the variables indicates that the corresponding values are determined at the respective monitoring instant. To determine and monitor the state of the rolling bearing W, the determined characteristic values K1, K2 are now compared with reference values R1, R2. The subsequent procedure in this connection will now be explained in greater detail with reference to FIGS. 2 and 3.

Figure 2:
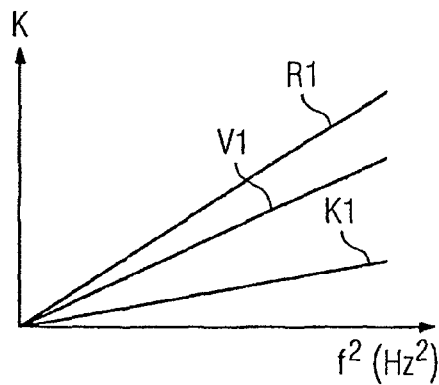
FIGS. 2 and 3 show graphical plots explaining an exemplary embodiment of the method in accordance with the invention.
Figure 3:
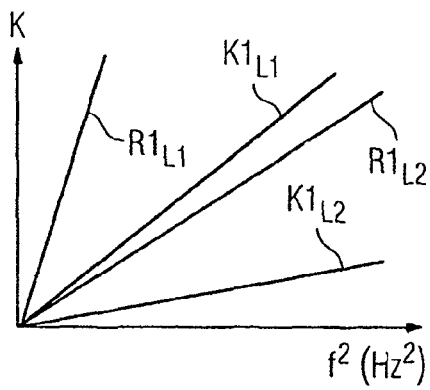

FIGS. 2 and 3 show graphical plots for explaining an exemplary embodiment of the method in accordance with the invention.

Extensive testing has shown that, for both the first sensor signal S1 and the second sensor signal S2, i.e., at the two frequencies or more specifically frequency bands adopted in the exemplary embodiment, there is a linear relationship between the speed of the rolling bearing and the signal amplitude, irrespective of the rolling bearing type. The characteristic values K1, K2, i.e., the respective product K of the maximum and RMS value of the sensor signals S1, S2, are proportional to the square of the speed of the rolling bearing. This is illustrated in FIG. 2 in which the relationship is represented schematically using the example of the first sensor signal S1.

In addition to the first characteristic value K1, FIG. 2 also shows a first reference value R1 which is determined in respect of a reference bearing likewise using the product K of the maximum and the RMS value of the first sensor signal S1, where the first reference value R1, because it is calculated correspondingly to the first characteristic value K1, likewise is dependent on the square of the speed of the rolling bearing, so that a straight line is also produced for the first reference value R1 in the representation in FIG. 2.

Both the first characteristic value K1 and the corresponding first reference value R1 are straight lines passing through the origin, as no signals are emitted when the rolling bearing is stationary. On the other hand, however, this means that, based on measurement of the first reference value R1 at a particular speed, the values of the first reference value R1 can be calculated for any other speeds of the rolling bearing. This is because the straight line shown in FIG. 2 is uniquely determined by the measured value and the origin. It is therefore sufficient to perform a measurement on a reference bearing at a particular speed of, for example, 25 Hz and to determine the first reference value R1 and the second reference value R2 from the sensor signals captured. On the basis of the reference values R1, R2 determined at the speed in question, the reference values R1, R2 for any other speed can then be determined in a simple manner. Consequently, ultimately one reference value R1, R2 suffices for each of the two sensor signals S1, S2 to characterize the reference bearing, or rather to enable the state of the rolling bearing to be monitored.

On the one hand, a rolling bearing in the run-in, undamaged state can be used as a reference bearing. If the first reference value R1 is or has been determined in respect of an undamaged reference bearing of this kind, ongoing damage to the rolling bearing can then be detected, for example, if the first characteristic value K1 exceeds the first reference value by a constant factor of, for example, 4 at the same speed. For simpler representation, a corresponding factor can also already be taken into account in the calculation of the first reference value R1, in which case a representation as shown in FIG. 2 would be produced. In the exemplary embodiment in FIG. 2, the monitored rolling bearing is not damaged, with the result that the first reference value R1 and the first characteristic value K1 essentially differ by the constant factor at the relevant frequency.

Alternatively to the procedure described above, the first reference value R1 can also be determined in respect of a damaged reference bearing. In this case, a diagram as shown in FIG. 2 could also result, where for the case that the first characteristic value K1 attains the first reference value R1, it can be assumed that the monitored rolling bearing is damaged correspondingly or at least in a similar manner or severity to the reference bearing used.

The foregoing explanations show that for a simple and diagnostically useful evaluation of the captured sensor signals S1, S2 in the exemplary embodiment described, in each case only one parameter, which can be given, for example, by the gradient of the straight lines shown in FIG. 2 for R1, is required for determining the speed-dependent reference values R1, R2 for each of the sensor signals S1, S2. From these parameters, the specific respective reference value R1, R2 can be calculated directly as a function of the respective operating speed.

As soon as one of the characteristic values K1, K2 exceeds the respective reference value R1, R2 at the same speed for a defined time period, an alarm, such as a red signal lamp, can be activated. In addition, by comparing the characteristic values K1, K2 determined with the respective reference values R1, R2 in accordance with the exemplary embodiment described, an early warning in the form of activation of a yellow signal lamp, for example, can be implemented in a particularly simple manner. For example, this makes it advantageously possible for the user or operator of the rolling bearing to specify an "early warning factor" of less than 1 by which the reference value R1, R2 is multiplied. If during bearing monitoring a first characteristic value K1 or a second characteristic value K2 is attained which is above the early warning value specified in this way, but below the actual respective reference value R1 or R2, an appropriate early warning is advantageously generated. A corresponding "borderline" for an early warning is shown in FIG. 2 in the form of the straight line V1.

The amplitudes of the sensor, i.e., the first sensor device SE1 and the second sensor device SE2, generally depend on the size or the rotating mass, i.e., ultimately the type of the rolling bearing. This usually also includes a dependence on the material of the rolling bearing, particularly in respect of the first sensor signal S1 because of the way it is produced. This will be explained in greater detail below with reference to FIG. 3.

FIG. 3 shows the first characteristic value K1 in each case for two rolling bearings L1 and L2 of a different type, where additionally the reference values $R1_{L1}$ and $R1_{L2}$ valid for the respective rolling bearings L1, L2 are also shown. It can be clearly seen that both the first characteristic values $K1_{L1}$ and $K1_{L2}$ and the respective reference values $R1_{L1}$ and $R1_{L2}$ for the two rolling bearings L1 and L2 differ, a linear relationship being produced in each case, however, as a function of the square of the speed $f^2$ of the rolling bearings L1, L2 in the graphical representation as shown in FIG. 2.

Figure 4:
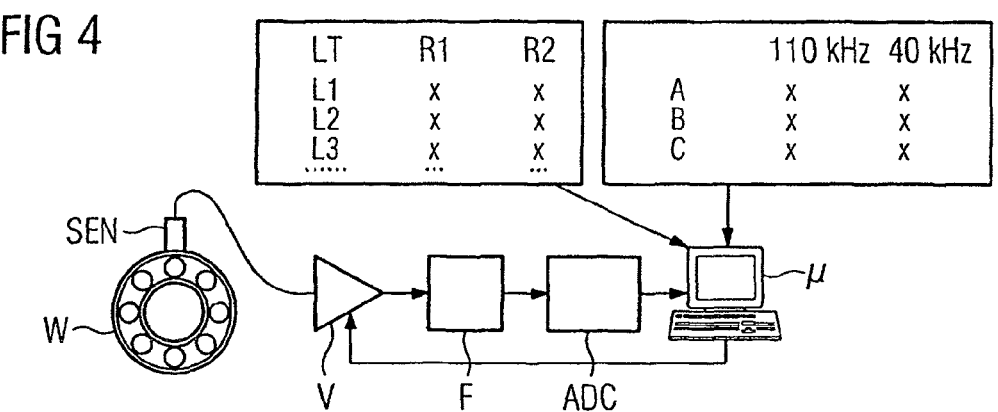
FIG. 4 schematically illustrates a second exemplary embodiment of the arrangement in accordance with the invention.

FIG. 4 schematically illustrates a second exemplary embodiment of the arrangement according to the invention.

FIG. 4 shows a rolling bearing W on which is mounted a sensor SEN with sensor units for capturing the first and the second sensor signal. The respective sensor signals are amplified by an amplifier unit V and fed to a filter F having first and second signal processing devices for determining at least one characteristic value from the signal shape of the respective sensor signal. The correspondingly filtered values are fed through an A/D converter (ADC) to an evaluation device μ, such as a microcontroller or PC. As the sensor SEN incorporating the sensor devices has to cover a large signal range, exacting dynamic requirements are placed on the amplifier unit V. This is achieved by the amplifier unit V being tuned to a suitable amplification stage by the control unit, i.e., the evaluation device μ, as a function of the input signal strength.

As well as controlling the amplifier unit V, the evaluation device μ is used in particular for evaluating and displaying the measurement results. For this purpose, the evaluation device μ advantageously has a data table in which the respective reference values R1, R2 for a particular speed of the respective rolling bearing L1, L2, L3 are stored for each bearing type LT, i.e., rolling bearing L1, L2, L3, . . . . Although rolling bearings W are in practice subjected to different loads, it has been found that the effect of the load on the respective characteristic and reference values in the permissible load range of a rolling bearing W is negligible. The reference values R1, R2 can, for example, be captured once for rolling bearings of a different type and stored in the data table. By reading out the reference values R1, R2 of the rolling bearing W to be monitored, a simple and reliable monitoring of the state of the rolling bearing W by the evaluation device μ is possible.

The evaluation device μ additionally offers the possibility of making user-specific presets in respect of evaluating the sensor signals captured. In the exemplary embodiment shown, it is thus possible to predefine, by a parameter A, an early warning level, e.g., in percent, by a parameter B, a time window, e.g., in seconds, and by a parameter C, a degree of exceedance, e.g., in percent. Consequently, the parameter A corresponds to the early warning factor explained in connection with FIG. 2. The meaning of the parameters B and C will be explained in greater detail in connection with FIG. 7. Generally speaking, the presetting of the parameters A, B, C can be effected independently of one another for the first sensor signal captured at the first resonant frequency of 110 kHz and the second sensor signal captured at the second resonant frequency of 40 Hz.

It should be stressed that, alternatively to the above described methods for performing the comparison of the at least one first characteristic value with the at least one first reference value, and of the at least one second characteristic value with the at least a second reference value, other methods for determining the state of the rolling bearing from the first sensor signal and the second sensor signal are also conceivable. This also applies in particular to the variable used as the characteristic value in each case. However, it must be noted that in general the dependence of the respective characteristic value on the speed of the rolling bearing must be taken into account.

Figure 5:
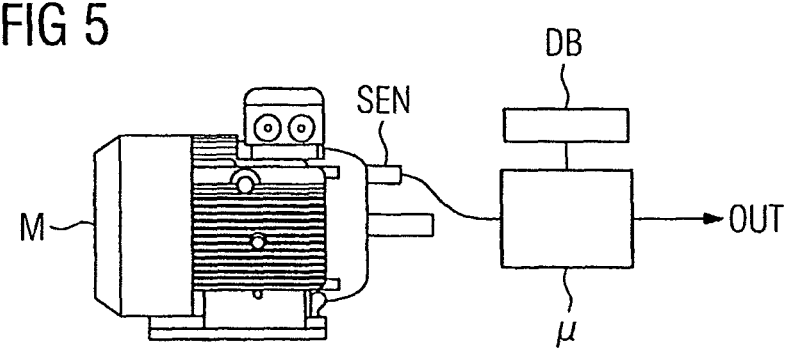
FIG. 5 schematically illustrates a third exemplary embodiment of the arrangement in accordance with the invention.

FIG. 5 shows a third exemplary embodiment of the arrangement in accordance with the invention in the form of a motor M whose rolling bearing is monitored by a sensor SEN. As in the above, it shall also be assumed in the exemplary embodiment in FIG. 5 that the sensor SEN comprises two sensor units each having an oscillatory system and each capturing signals around resonant frequencies of approximately 110 kHz or approximately 40 kHz with a bandwidth of about 5 kHz. The resonant frequency ranges each produce an envelope curve signal from which the respective maximum and RMS values are extracted to determine a first and a second characteristic value as described above.

In the exemplary embodiment in FIG. 5, an evaluation device μ is used for processing and evaluating the sensor signals, said device also incorporating the first and second signal processing device described in connection with FIG. 1, for example. These components can, for example, also be implemented as a common integrated circuit. It is possible for the evaluation device μ to output the evaluation result for the purposes of further processing, i.e., such as display, over an interface OUT. In the context of monitoring the rolling bearing of the electric motor M, the evaluation device μ advantageously accesses, in a similar manner to the exemplary embodiment in FIG. 4, a storage device DB in which at least one first reference value R1 and at least one second reference value R2 are stored.

Figure 6:
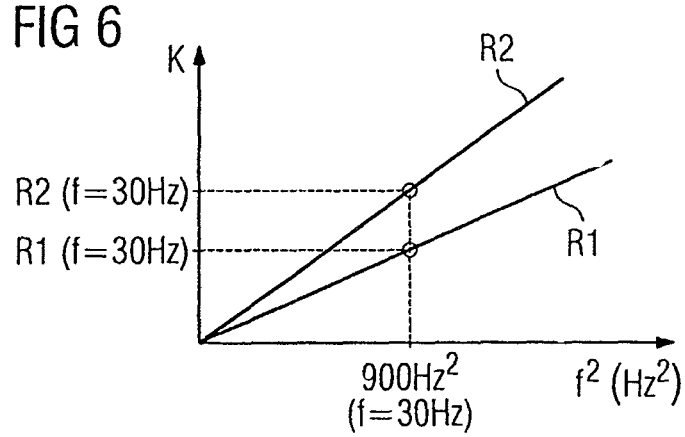
FIGS. 6 and 7 show further graphical plots explaining the exemplary embodiment of the method in accordance with the invention.

FIG. 6 shows another graphical plot for explaining the exemplary embodiment of the method in accordance with the invention. The first reference value R1 and the second reference value R2, which are again given by the product K of amplitude values and an RMS value determined for a reference rolling bearing, are each plotted as a function of the square of the speed $f^2$. It shall be assumed that the monitored rolling bearing is a type 6208 rolling bearing operated at a speed of 30 Hz. It shall also be assumed that an arrangement as shown in FIG. 5 is used, where the gradient of the straight line shown in FIG. 6 is stored in the storage device DB for the speed-dependent determination of the reference values R1 and R2. It should be pointed out that the storage device DB does not necessarily have to be disposed in close proximity to the evaluation device. For example, the storage device DB can be a central database server which can be interrogated by the evaluation device μ by a wireless or wireline communications interface.

To determine and monitor the rolling bearing, it is now possible for the evaluation device μ to retrieve from the storage device DB the value of the two gradients specifically for a type 6208 rolling bearing. From the behavior of the gradients characterizing the reference bearing, the first reference value R1 and the second reference value R2 can then be determined for the rolling bearing operating speed of 30 Hz. If during operation of the rolling bearing, at least one of the characteristic values K1, K2 exceeds the respective reference value R1, R2 for a particular user-definable time period, e.g., 30 minutes, an alarm signal is advantageously output. In the alarm signal or in addition to the alarm signal, the user or operator of the rolling bearing can be informed as to whether the first characteristic value K1 or the second characteristic value K2 exceeds the respective associated reference value R1, R2, i.e., whether the state of the rolling bearing is critical in terms of ongoing bearing damage and/or bearing damage that has already occurred.

Figure 7:
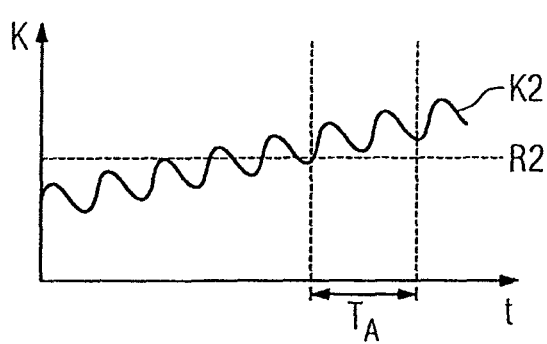

FIG. 7 shows another graphical plot for explaining the exemplary embodiment of the method in accordance with the invention. Here, the second characteristic value K2, i.e., the characteristic value determined at a resonant frequency of 40 kHz, is represented as a function of time t. The associated second reference value R2 is also indicated by the horizontal dashed line.

Depending on the respective application of the monitored bearing, an alarm shall generally not be raised immediately if a reference value is briefly exceeded, i.e., an alarm signal shall only be triggered if the value is exceeded for a lengthy period. To this end, it is advantageously possible for the user to specify a time period $T_A$ and a degree of exceedance. These correspond to the parameters B and C mentioned in connection with FIG. 4 and are used such that, in the case of a degree of exceedance of for example 80%, an alarm signal is only triggered if, within a time window of length $T_A$, the characteristic value in question exceeds its associated reference value for at least 80% of the time duration $T_A$. In the exemplary embodiment in FIG. 7, the second reference value R2 is exceeded by the second characteristic value K2 for the entire predefined time period $T_A$. As a result, an alarm signal is generated and output by the evaluation device μ.

In the exemplary embodiment described, it shall be assumed that the first characteristic value K1 (not shown in FIG. 7 for reasons of clarity) does not exceed its associated reference value R1. In this case the measurement result is interpreted as indicting that the active damage rate, i.e., the ongoing damage, of the monitored rolling bearing is not high enough to exceed the first reference value. However, the accumulated damage that has already occurred, i.e., the total damage present, exceeds an acceptable amount, so that the rolling bearing and, associated therewith, the component of which the rolling bearing is part, and possibly a controlled process or an entire plant, will be at risk. An alarm is therefore triggered as a result of the second reference value R2 being exceeded by the second characteristic value K2.

As mentioned above, the particular advantage of the method in accordance with the invention is that a single sensor with two sensor units can be used for monitoring the state of rolling bearings of any kind, provided they are of the same material, i.e., steel, for example. When using a corresponding sensor for a rolling bearing of another material, it is advantageously merely necessary to change the first resonant frequency of the sensor. Should the rolling bearing be made of ceramic, for example, a sensor of the same design having an identical second resonant frequency could be used. As explained above, the first resonant frequency is dependent on the material and would therefore, for ceramic, generally be different from the 110 kHz previously specified for steel.

As the method and the arrangement preferably use two narrowband resonant frequencies, complex analyses of a larger frequency range, for example, in respect of rollover frequencies dependent on the size of the monitored rolling bearing, are not required. In addition, according to the above-described exemplary embodiments for determining the state of the monitored rolling bearing, it is advantageously merely necessary to transmit two parameters or reference values to the evaluation device.

Figure 8:
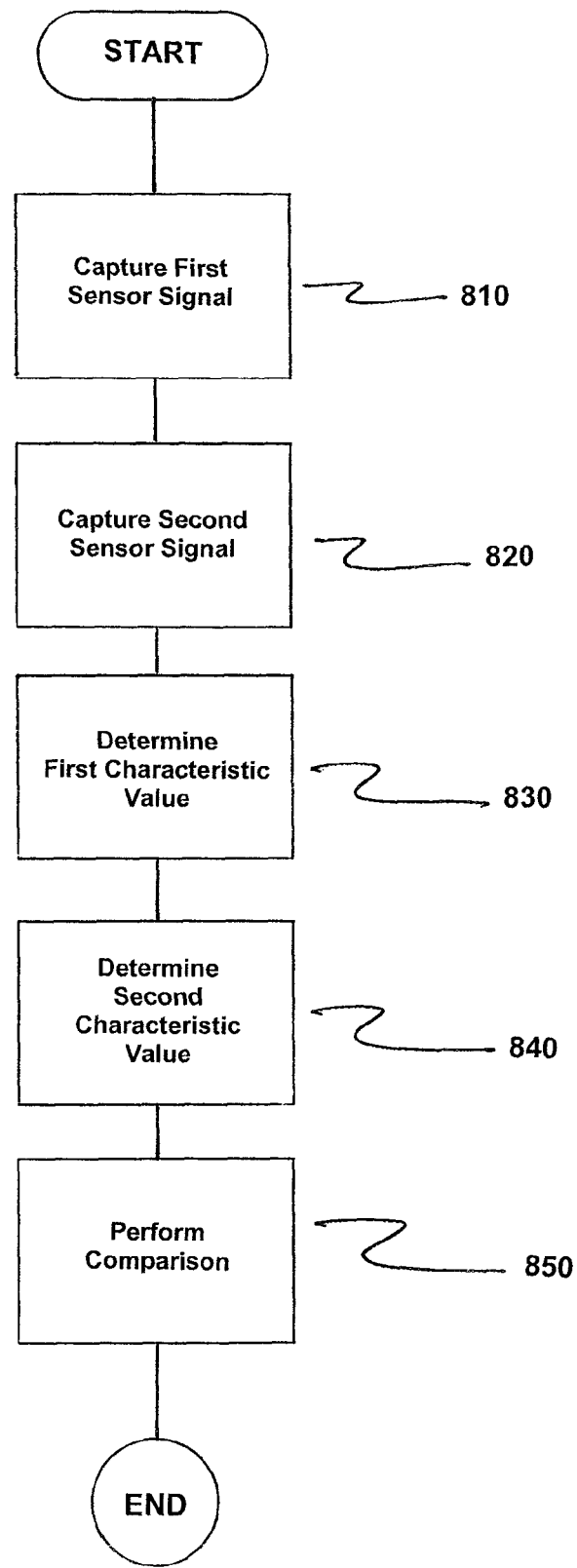
FIG. 8 is a flow chart of the method in accordance with an embodiment of the invention.

FIG. 8 is a flow chart of a method for determining and monitoring a state of a rolling bearing during operation of the rolling bearing. The method comprises capturing a first sensor signal comprising an acoustic emission signal in a first frequency band in an ultrasonic range, as indicated in step 810. A second sensor signal in a second frequency band is captured at a lower frequency in the ultrasonic range, as indicated in step 820.

Next, at least one first characteristic value for ongoing damage to the rolling bearing is determined from a signal shape of the first sensor signal, as indicated in step 830. At least one second characteristic value for damage that has already occurred to the rolling bearing is determined from a signal shape of the second sensor signal, as indicated in step 840.

A comparison of the at least one first characteristic value with at least one first reference value dependent on a speed of the rolling bearing and the at least one second characteristic value with at least one second reference value dependent on the speed of the rolling bearing is performed to determine the state of the rolling bearing, as indicated in step 850. For a steel rolling bearing, the first sensor signal is captured at a resonant frequency of between 100 kHz and 120 kHz and the second sensor signal is captured at a second resonant frequency in a frequency range of between 25 kHz and 50 kHz.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A method for determining and monitoring a state of a rolling bearing during operation of the rolling bearing, the method comprising:
    capturing a first sensor signal comprising an acoustic emission signal in a first frequency band in an ultrasonic range;
    capturing a second sensor signal in a second frequency band at a lower frequency in the ultrasonic range;
    determining at least one first characteristic value for ongoing damage to the rolling bearing from a signal shape of the first sensor signal;
    determining at least one second characteristic value for damage that has already occurred to the rolling bearing from a signal shape of the second sensor signal; and
    comparing the at least one first characteristic value with at least one first reference value dependent on a speed of the rolling bearing and comprising the at least one second characteristic value with at least one second reference value dependent on the speed of the rolling bearing to determine the state of the rolling bearing;
    wherein, for a steel rolling bearing, the first sensor signal is captured at a resonant frequency of between 100 kHz and 120 kHz and the second sensor signal is captured at a second resonant frequency in a frequency range of between 25 kHz and 50 kHz.

2. The method as claimed in claim 1, wherein the at least one first characteristic value is compared with at least one first reference value also dependent on at least one of a material, size, mass and type of the rolling bearing.

3. The method as claimed in claim 1, wherein the at least one second characteristic value is compared with at least one second reference value also dependent on at least one of a material, size, mass and type of the rolling bearing.

4. The method as claimed in claim 2, wherein the at least one second characteristic value is compared with at least one second reference value also dependent on the at least one of the material, size, mass and type of the rolling bearing.

5. The method as claimed in claim 4, wherein the second sensor signal is captured independently of the at least one of the material, size and speed of the rolling bearing by a second mechanically oscillatory system with a second resonant frequency.

6. The method as claimed in one claim 1, wherein the first sensor signal is captured by a first mechanically oscillatory system at a first resonant frequency dependent on a material of the rolling bearing and independent of a size and speed of the rolling bearing.

7. The method as claimed in one claim 1, wherein the first sensor signal is captured in a first frequency band with a bandwidth of 4 kHz to 8 kHz.

8. The method as claimed in claim 1, wherein the second sensor signal is captured in a second frequency band with a bandwidth of 3 kHz to 7 kHz.

9. The method as claimed in claim 8, wherein an alarm signal is output if at least one of the at least one first characteristic value and the at least one second characteristic value deviate from the a respective one of the at least one first and second reference values over a defined time period.

10. The method as claimed in claim 1, wherein a product of a maximum value and an RMS value of a respective one of the first and second sensor signals is determined to determine the first characteristic value and the second characteristic value.

11. An arrangement for determining and monitoring a state of a rolling bearing during operation, comprising:
    a first sensor device for capturing a first sensor signal comprising an acoustic emission signal in a first frequency band in the ultrasonic range, the first sensor device being configured to capture the first sensor signal at a first resonant frequency between 100 kHz and 120 kHz to determine the state of a steel rolling bearing;
    a second sensor device for capturing a second sensor signal in a second frequency band of lower frequency in a frequency range between 25 kHz and 50 kHz;
    a first signal processing device for determining, from a signal shape of the first sensor signal, at least one first characteristic value for ongoing damage to the rolling bearing;
    a second signal processing device for determining, from a signal shape of the second sensor signal, at least one second characteristic value for damage that has already occurred to the rolling bearing; and
    an evaluation device for determining the state of the rolling bearing by comparing the at least one first characteristic value with at least one reference value dependent on the speed of the rolling bearing and comprising the at least one second characteristic value to at least one second reference value dependent on a speed of the rolling bearing.

12. The arrangement as claimed in claim 11, wherein the evaluation device is configured to compare the at least one first characteristic value with at least one first reference value also dependent on at least one of a material, size, mass and type of the rolling bearing.

13. The arrangement as claimed in claim 12, wherein the evaluation device is configured to compare the at least one second characteristic value with at least one second reference value also dependent on the at least one of the material, size, mass and type of the rolling bearing.

14. The arrangement as claimed in claim 13, wherein the second sensor device has a second mechanically oscillatory system for capturing the second sensor signal independently of the material, size and speed of the rolling bearing.

15. The arrangement as claimed in claim 11, wherein the evaluation device is configured to compare the at least one second characteristic value with at least one second reference value also dependent on at least one of a material, size, mass and type of the rolling bearing.

16. The arrangement as claimed in claim 11, wherein the first sensor device has a first mechanically oscillatory system with a first resonant frequency for capturing the first sensor signal dependently on the material of the rolling bearing and independently of the size and speed of the rolling bearing.

17. The arrangement as claimed in claim 11, wherein the first sensor device is configured to capture the first sensor signal in a first frequency band with a bandwidth of 4 kHz to 8 kHz.

18. The arrangement as claimed in claim 11, wherein the second sensor device is configured to capture the second sensor signal in a second frequency band with a bandwidth of 3 kHz to 7 kHz.

19. The arrangement as claimed in claim 11, wherein the first and second signal processing device are configured to determine a product of a maximum and an RMS value of a respective one of the first and second sensor signals to determine the first and second characteristic values, respectively.

20. The arrangement as claimed in claim 11, wherein the evaluation device is configured to output an alarm signal if at least one of the at least one first characteristic value and the at least one second characteristic value deviates from a respective one of the first and second reference values over a defined period of time.

21. The arrangement as claimed in claim 11, wherein the first and the second sensor devices comprise a common micromechanical system.

22. The arrangement as claimed in claim 11, wherein at least one of the first and the second sensor devices are implemented as one of piezoelectric, piezoresistive, capacitive and inductive sensor units.

23. The arrangement as claimed in claim 11, wherein the first signal processing device, the second signal processing device and the evaluation device are combined in an integrated electrical circuit.

24. The arrangement as claimed in claim 11, wherein the first and the second sensor devices are combined in an integrated electrical circuit.

25. The arrangement as claimed in one of claim 11, further comprising:
- an amplifier unit for amplifying at least one of the first and the second sensor signals;
- wherein the evaluation device is configured to adjust a gain of the amplifier unit.

* * * * *